(12) United States Patent
Gawne et al.

(10) Patent No.: US 12,441,362 B2
(45) Date of Patent: Oct. 14, 2025

(54) VEHICLE CONTROL SYSTEM (71) Applicant: Transportation IP Holdings, LLC, Norwalk, CT (US)

(72) Inventors: Kendrick Gawne, Cedar Rapids, IA (US); Alex Young, Cedar Rapids, IA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 223 days.

(21) Appl. No.: 18/462,585

(22) Filed: Sep. 7, 2023

(65) Prior Publication Data

US 2024/0116535 A1    Apr. 11, 2024

Related U.S. Application Data (60) Provisional application No. 63/414,247, filed on Oct. 7, 2022.

(51) Int. Cl.
| | |
|---|---|
| *B60W 30/18* | (2012.01) |
| *B60T 7/12* | (2006.01) |
| *B60W 50/14* | (2020.01) |
| *B60W 60/00* | (2020.01) |
| *G01C 21/34* | (2006.01) |

(52) U.S. Cl.
CPC ............. *B60W 60/001* (2020.02); *B60T 7/12* (2013.01); *B60W 30/18072* (2013.01); *B60W 50/14* (2013.01); *G01C 21/3407* (2013.01); *B60W 2556/50* (2020.02)

(58) Field of Classification Search
CPC ......... B60W 60/001; B60W 30/18072; B60W 50/14; B60W 2556/50; B60T 7/12; G01C 21/3407; B61L 15/0072; B61L 25/025; B61L 27/20; B61L 27/40; G08G 1/096775; G08G 1/096811; G08G 1/096838; G08G 1/096866
See application file for complete search history.

(56) References Cited

U.S. PATENT DOCUMENTS

| | | | |
|---|---|---|---|
| 12,263,820 B2 * | 4/2025 | Parisian | B60T 13/662 |
| 2020/0189632 A1 * | 6/2020 | Saxena | B61L 23/007 |
| 2021/0104160 A1 * | 4/2021 | Gao | G06Q 10/02 |
| 2021/0116254 A1 * | 4/2021 | Fox | G01C 21/3691 |
| 2023/0150418 A1 * | 5/2023 | Zhou | G01S 17/89 362/466 |
| 2023/0204365 A1 * | 6/2023 | Ishida | G06Q 50/40 701/422 |
| 2024/0051587 A1 * | 2/2024 | Liu | B61L 27/40 |
| 2024/0062123 A1 * | 2/2024 | Wait | B61L 15/0027 |
| 2024/0262327 A1 * | 8/2024 | Parisian | B60T 13/662 |

* cited by examiner

*Primary Examiner* — Ashley L Redhead, Jr.
(74) *Attorney, Agent, or Firm* — K&L Gates LLP (57) ABSTRACT

A vehicle control system and method may obtain a route data file for a network of first routes that the vehicle system is headed toward from the off-board component, determine a set of potential routes from the first routes in the network using the route data file, present the set of the potential routes to an operator of the vehicle system, determine whether a selection of a selected route of the potential routes is received from the operator, and automatically change movement of the vehicle system responsive to not receiving the selection of the selected route.

20 Claims, 3 Drawing Sheets

VEHICLE CONTROL SYSTEM

CROSS-REFERENCE TO RELATED APPLICATIONS

This application claims priority to U.S. Provisional Application No. 63/414,247 (filed 7 Oct. 2022), the entire disclosure of which is incorporated herein by reference.

BACKGROUND

Technical Field

The subject matter described herein relates to vehicle control systems and methods that monitor and/or control movements of vehicle systems to ensure safe movement of multiple vehicle systems in a network of routes.

Discussion of Art

Some vehicle control systems monitor locations and movements of vehicle systems moving in a network of routes to limit where and/or when the vehicle systems can enter into various segments of the routes. For example, positive train control (PTC) systems may include off-board components (e.g., back office systems) that monitor locations of trains moving in a track network. The off-board components send signals to onboard components of the vehicle control systems that notify the vehicle systems whether the vehicle systems are permitted to enter into certain segments of the routes, how fast the vehicle systems can move in those segments, etc. Absent receiving a signal from the off-board component, the onboard component can inform an onboard operator and/or automatically operate to stop the vehicle system from entering into a route segment.

In currently known vehicle control systems, the vehicle systems may need to be initialized with route data and have a known route location to receive protection from the off-board components. In the event that a vehicle system is initialized but does not have a known route location, the vehicle system may enter or occupy territory monitored by the off-board component, but without receiving protection from the off-board component. This can increase the risk of collision or other unsafe travel of the vehicle system.

This presents a hazard both to that vehicle system as well as to other vehicle systems in the vicinity of the unprotected vehicle system. There is no currently known means to ensure that an initialized vehicle system determines a route location to receive protection from the vehicle control system.

There are several reasons that an initialized vehicle system may not have a known route location. The vehicle system may be occupying a route that is not mapped into a database of the off-board component of the vehicle control system. The on-board component may have presented a route option to the operator onboard the vehicle system (e.g., for selection or confirmation to inform the off-board component of the location or route identification of where the vehicle system is located), but may not have received a response. A navigation failure may have occurred which caused the onboard component to remove the last known route location.

It may be desirable to have a system and method that differs from those that are currently available.

BRIEF DESCRIPTION

A method is provided that may include obtaining route information for a network of first routes that a vehicle system is headed toward from an off-board component of a vehicle control system that sends directive signals to the vehicle system to notify the vehicle system where the vehicle system can move, determining a set of potential routes from the first routes in the network using the route information, presenting the set of the potential routes to an operator of the vehicle system, determining whether a selection of a selected route of the potential routes is received from the operator, and responsive to not receiving the selection of the selected route, automatically changing movement of the vehicle system.

A vehicle control system is provided that may include a vehicle controller that may be onboard a vehicle system. The vehicle controller may obtain a route data file for a network of first routes that the vehicle system is headed toward from the off-board component. The vehicle controller may determine a set of potential routes from the first routes in the network using the route data file, present the set of the potential routes to an operator of the vehicle system, determine whether a selection of a selected route of the potential routes is received from the operator, and automatically change movement of the vehicle system responsive to not receiving the selection of the selected route.

A method is provided that may include determining a set of potential routes in a PTC system network of routes using a current location of a vehicle system, presenting the set of the potential routes to an operator of the vehicle system, determining whether a selection of a selected route of the potential routes is received from the operator, and responsive to not receiving the selection of the selected route, automatically slowing or stopping movement of the vehicle system.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to vehicle control systems that ensure that vehicle systems have identified the locations of the vehicle systems and/or route occupied by the vehicle systems and implement responsive actions to prevent continued movement of the vehicle systems that have not identified their locations and/or routes occupied by those vehicle systems. Once the onboard component of a vehicle system has been initialized (e.g., by reporting or confirming the location or route occupied by the vehicle system), the vehicle system can communicate with the off-board component to obtain and may load the data files for routes in the portion of the route network that the off-board component may be monitoring and/or that the vehicle system may travel through. Once the route data for the route(s) are loaded, the onboard component can compare position data (such as from an onboard locator device, such as a global navigation satellite system, or GNSS system, such as a global positioning system, or GPS, receiver) against the loaded route data and may determine which routes that the vehicle system may or will occupy. If a possible solution can be identified, the solution (e.g., the routes that the vehicle system may be located on) may be presented to the operator onboard the vehicle system for selection.

The onboard component may continue to determine the routes that the vehicle system may occupy and when a possible solution is identified that is within the portion of the route network monitored by the off-board component, the onboard component may require the operator onboard the vehicle system to respond to the route selection options. If the operator fails to react to the route selection options in a set period of time or distance that the vehicle system has moved after presenting the route options, the onboard component may implement one or more responsive actions, such as automatically slowing or stopping movement of the vehicle system, to prevent the vehicle system from continuing movement.

The route solutions presented to the onboard operator may be limited to those within the portion of the route network monitored by the off-board component, or could include those within a configurable distance from or outside this portion or territory. This may protect not just movement within, but also entry into the monitored territory. Route solutions outside of this territory may be considered or ignored based on whether the vehicle system is approaching or departing the territory.

Even if there is a known route location, the protection provided by the off-board system could be applied if the known route location is not within the monitored territory but there are solutions identified on parallel or nearby routes that are in the monitored territory. This may protect against an operator selection of an incorrect route that is nearby, but that the vehicle system is not actually on (e.g., a neighboring parallel route).

The protection provided by the vehicle control system may be applied while the vehicle system moving or while stopped (e.g., stationary). This could cause a brake application immediately or could give the operator the option of time to approve the proposed route solution or to even indicate that the vehicle system is correctly unmapped (e.g., the vehicle system is not on a route monitored by the off-board system). The onboard component can send an accompanying message to the off-board component that indicates the condition that is detected (e.g., the route selected by the onboard component).

Once the vehicle system is initialized, the onboard component should have the necessary data files for the routes loaded, and only those data files for the routes that the vehicle system will or may travel. Alternatively, more data files may be provided from the off-board component to the onboard component.

One or more examples of the inventive subject matter described herein involve a process by which a location of a vehicle system is determined (e.g., by the vehicle system itself or another source), the location is reported to an off-board system, and the off-board system sends potential routes that the vehicle system may be located on based on the reported location (and for selection by the vehicle system or an operator). Not all embodiments of the inventive subject matter require determining the location of the vehicle system prior to sending potential occupied routes to the vehicle system, however. For example, a set of potential routes that the vehicle system may be located on (e.g., may occupy) can be sent to the vehicle system without the location of the vehicle system first being reported or determined. The off-board system can, for example, send a set of potential routes to the vehicle system based on a previously reported location, send a set of default potential routes, send a set of all routes monitored by the off-board system, etc.

While one or more embodiments are described in connection with a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
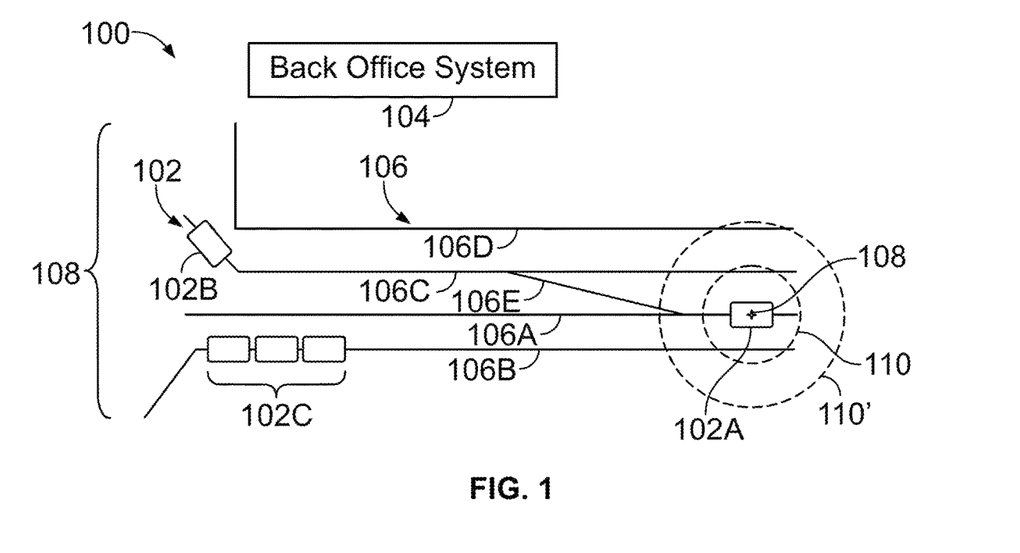
FIG. 1 illustrates one example of a vehicle control system.

FIG. 1 illustrates one example of a vehicle control system 100. The vehicle control system may include onboard components (described below) disposed onboard vehicle systems 102 (e.g., vehicle systems 102A-C in FIG. 1) and an off-board component or system 104, such as a back office system (labeled "Back Office System" in FIG. 1). The off-board component can represent hardware circuitry that includes and/or is connected with one or more processors (e.g., one or more microprocessors, field programmable gate arrays, integrated circuits, etc.) that perform the operations described herein. While only three vehicle systems and one off-board component are shown in FIG. 1, more or fewer vehicle systems may be monitored and/or more off-board components may be provided. For example, multiple off-board components may monitor the same network 108 of routes 106 or different portions of the network of routes. The routes can represent roads, highways, tracks, paths, or the like.

The onboard component of the vehicle system can determine and report the location of the vehicle system. This location can be an identification of a route, a geographic location (e.g., longitude, latitude, altitude, etc.), or the like. The location can be determined by a locator device onboard the vehicle system, based off input provided by an operator, from an off-board device (e.g., a wayside device, such as a radio frequency identification, or RFID, reader, a camera, etc.), or the like.

The off-board system can receive or otherwise determine (e.g., from other sensors, from operator input, from wayside sensors, etc.) the reported locations of multiple ones of the vehicle systems and determine and send directive signals to the vehicle systems to notify the vehicle systems where the vehicle systems can move, how the vehicle systems can move (e.g., how fast the vehicle systems can move), or the like. For example, the vehicle control system can be a positive vehicle control system that sends signals indicating that a vehicle system can enter into a segment or portion of a route, how fast the vehicle system can move within that route segment, etc. Absent receiving such a signal, the onboard component of the vehicle system can notify an operator of that vehicle system and/or automatically act to prevent entry of the vehicle system into that route segment (and/or to prevent the vehicle system from moving in a way that violates the permission granted by the off-board component). Optionally, the vehicle control system can be a negative vehicle control system that sends signals indicating that a vehicle system cannot enter into a segment or portion of a route, how fast the vehicle system can move within that route segment, etc. Absent receiving such a signal, the onboard component of the vehicle system can allow the vehicle system to move in the route segment. But if such a signal is received, the onboard component can notify an operator of that vehicle system and/or automatically act to prevent entry of the vehicle system into that route segment (and/or to prevent the vehicle system from moving in a way that violates the signal received from the off-board component). In one embodiment, the off-board component and/or the onboard components may be parts of a positive vehicle control system, such as a PTC control system. Optionally, the onboard component and or the off-board component may be parts of a negative vehicle control system or another type of vehicle control system. As described above, not all embodiments of the subject matter described herein are limited to rail vehicles, and the off-board component and onboard components may be parts of a control system that controls movements of other types of vehicles, such as automobiles, trucks, buses, mining vehicles, agricultural vehicles, aircraft, marine vessels, or the like.

The off-board component can obtain route information for the network or portion of the network of routes that the vehicle system is headed toward. This route information can be obtained from a tangible and non-transitory computer readable memory, such as a computer hard drive. This route information can include locations of the routes, layouts of the routes, speed limits of the routes, segments of routes that are undergoing maintenance or that may have maintenance crews present, segments of routes currently occupied by vehicle systems (or that will be occupied by vehicle systems), etc. For example, responsive to receiving or determining the location of the vehicle system, the off-board component can obtain, from a memory, the route information for a portion, but not all, of the network of routes. This route information can be obtained for a set of potential routes that the vehicle system may travel upon using the current location of the vehicle system. This set of routes can be the routes that the vehicle system is headed toward, that the vehicle system may be able to reach or travel upon within a designated distance or time, etc.

The route information for the routes in this set may be communicated form the off-board component to the onboard component of the vehicle system. For example, one or more data files containing the layouts, speed limits, presence of maintenance crews and/or other vehicle systems, etc., of the routes may be wirelessly communicated from the off-board component to the onboard component of the vehicle system. Alternatively, the off-board component may send the data files containing the route information for more routes, such as all the routes monitored by the off-board component.

The onboard component of the vehicle system can then present the set of the potential routes to an operator of the first vehicle system. This can be accomplished by the onboard component directing an input/output device (e.g., an electronic display, touchscreen, speaker, etc.) to visually and/or audibly present identifications of potential routes on which the vehicle system may be located. For example, the vehicle system may determine and report a reported position or location 108 of the vehicle system 102A to the off-board component. This reported position may be determined by a locator device, by operator input, by a dead reckoning system, or the like. The off-board component can receive or determine the reported position, and reference a route database stored in the memory of the off-board component. This database may include the data files for the routes, or may separately store the layouts, locations, speed limits, etc. of the routes in the territory monitored by the off-board component. The off-board component can determine which routes are within a threshold distance 110 of the reported position or location. As shown in FIG. 1, there are three potential routes 106A, 106B, 106C within the threshold distance of the reported position of the vehicle system as portions of these three routes are within the threshold distance of the reported position.

The threshold distance used to identify potential routes may be configurable. For example, the threshold distance can be increased (e.g., from the threshold distance 110 to a modified threshold distance 110') or decreased in size (e.g., from the threshold distance 110' to a modified threshold distance 110). Increasing the size of the threshold distance can result in more routes being identified as potential routes while decreasing the size of the threshold distance can result in fewer routes being identified as potential routes. For example, with the threshold distance 110 being used, the routes 106A-C are selected for communication to and presentation by the onboard component as potential routes. With the threshold distance 110' being used, more routes 106A-E are selected for communication to and presentation by the onboard component as potential routes.

The identified potential routes may be reported (e.g., communicated wirelessly and/or via wired connections) from the off-board component to the onboard component of the vehicle system 106A. The onboard component can present identifications of these potential routes, such as by visually and/or audibly presenting a list, table, map, or the like, of identifications (e.g., unique identifiers, names, maps, etc.) of the potential routes. The onboard component can determine whether a selection of any of these potential routes that are presented is received. For example, the onboard component can determine whether an operator onboard the vehicle system 102A provided input that identified or selected a potential route that was presented to the operator. Alternatively, the onboard component can automatically select one of the potential routes based on the reported location of the vehicle system (e.g., the potential route that is closer to the reported location than one or more, or all, other potential routes).

The onboard component can communicate (e.g., send a signal wirelessly and/or via wired connections) the selection from the potential routes to the off-board component. If the selection is received by the off-board component from the onboard component, then the off-board component can continue communicating with the onboard component as the vehicle system moves in the route network to track movement of the vehicle system and inform the vehicle system where, when, and/or how the vehicle system can safely enter and/or travel through different routes segments. This results in the off-board component providing protection to the vehicle system during travel in the route network (e.g., to avoid collisions with the vehicle systems 102B, 102C, to avoid collisions with maintenance personnel, to avoid traveling faster than a speed limit, and the like).

But the onboard component may not report a route selected from the potential routes to the off-board component. This can occur when an operator onboard the vehicle system does not select a route from the list of potential routes presented onboard the vehicle system, from a communication error preventing the list of potential routes from being communicated to the onboard component, from a communication error preventing the selected route from being communicated from the onboard component to the off-board component, or the like.

Responsive to not receiving a selection of a route from the onboard component, the off-board component can send one or more control signals to change movement of the vehicle system (e.g., send the signals wirelessly, send the signals via conductive pathways, such as through a rail or catenary along the route, etc.). The movement may be changed to prevent the vehicle system from unsafely traveling in the route network. As one example, the off-board component can send a signal to the onboard component directing the onboard component to automatically engage one or more brakes of a brake system of the vehicle system to stop continued movement of the vehicle system. As another example, the off-board component can send a signal to the onboard component that directs the onboard component to automatically slow down movement of the vehicle system to no faster than a designated speed limit (that may be slower than the speed limit of the route). In another example, the off-board component can send a signal that directs the onboard component of the vehicle system to coast to a stop. For example, this signal can direct the onboard component to stop supply of electric current to a motor, to stop supply of fuel to an engine, or the like, to allow the vehicle system to gradually slow down and stop movement (to avoid abruptly stopping the vehicle system).

Optionally, the off-board component may send a confirmation signal to the onboard component responsive to the onboard component sending (and the off-board component receiving) the route selection. If no route selection is received by the off-board component from the vehicle system, then the off-board component may not send, and the onboard component may not receive, a confirmation signal. In response to not receiving the confirmation signal, the onboard component may automatically implement one or more responsive actions to slow or stop movement of the vehicle system, as described above.

The control signal may be sent from the off-board component to the onboard component and/or the onboard component may wait for the confirmation signal for a designated period of time before automatically changing movement of the vehicle system. For example, the off-board component may wait for a designated period of time after sending the list or set of potential routes to the onboard component of the vehicle system. If the off-board component does not receive a selection of a route from the list or set of potential routes within this designated period of time, the off-board component may determine that no route selection has occurred. As a result, the off-board component may then send the control signal to the onboard component that directs the onboard component to automatically change movement of the vehicle system, as described above. As another example, the onboard component may wait for the designated period of time after sending selected route. If the confirmation signal is not received from the off-board component within the designated period of time after sending the route selection, then the onboard component may change movement of the vehicle system, as described above. This designated period of time may be configurable, such as by allowing the off-board component and/or the onboard component to lengthen or shorten the designated period of time.

Controlling the vehicle system to slow or stop movement when no route selection is made or received may occur while the vehicle system is moving. For example, the vehicle system may be moving along a route when the onboard component sends the reported location to the off-board component, when the off-board component sends the list or set of potential routes to the onboard component, when the onboard component presents the list or set of potential routes onboard the vehicle system, and/or when the onboard component sends the selected route to the off-board component. As described above, one or more responsive actions may be implemented to slow or stop movement of the vehicle system if no route selection is received or confirmed during this movement.

In another example, the vehicle system may be stationary and not moving when the on board component sends the reported location to the off-board component when the off-board component sends a list or set of potential routes to the onboard component, when the onboard component presents a list or set of potential routes onboard the vehicle system, and/or when the onboard component sends the selected route to the off-board component. If no route selection is received or confirmed while the vehicle system is stationary, the onboard component may prevent movement from being initiated, such as by automatically applying one or more brakes, by withholding or preventing power from being supplied to a propulsion system of the vehicle system, and so on.

The onboard component may send a notification signal to the off-board component responsive to a route not being selected from the presented list or set of potential routes. For example, the onboard component may present the list or set of potential routes to an operator onboard the vehicle system. The onboard component may wait for a configurable threshold period of time for a selection of a route from the list or set. If no such selection is received within this period of time, then the onboard component may determine that no route selection has been made. The onboard component made then send a notification signal to the off-board component notifying the off-board component that no route selection has been received. The off-board component made then direct the onboard component to implement and/or the onboard component may automatically implement one or more of the responsive actions described here end to slow, stop, or prevent movement of the vehicle system.

Figure 2:
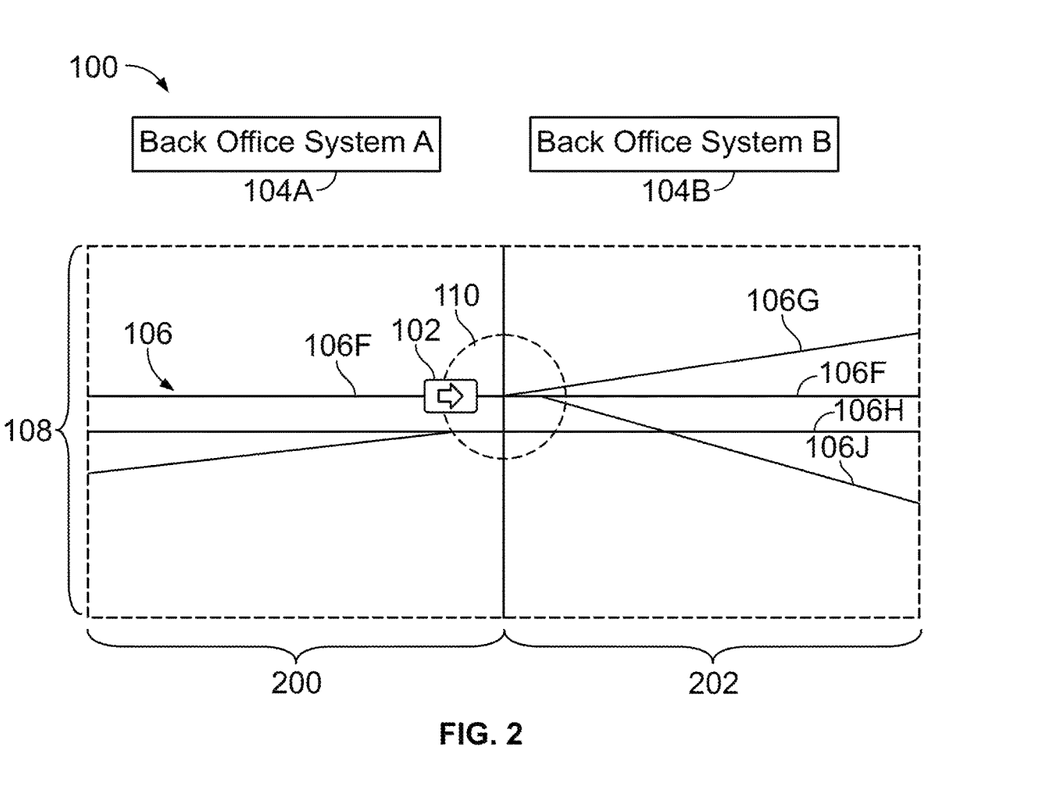
FIG. 2 illustrates another example of the vehicle control system.

FIG. 2 illustrates another example of the vehicle control system 100. The vehicle control system may include the onboard components disposed onboard the vehicle systems and multiple off-board components or systems, such as a back office systems 104A, 104B shown in FIG. 2. In the illustrated example, each off-board component may monitor movements of vehicle systems traveling in different areas or portions 200, 202 of the route network. For example, the off board component 104A may monitor movements of vehicle systems within a first portion 200 of the network of routes, while another off-board component 104B may monitor movements of vehicle systems within a different, second portion 202 of the route network. The different portions of the route network may not overlap with each other such that only one off-board component monitors the movements of the vehicle systems within each portion of the route network. Optionally, two or more portions of the network of routes may overlap (partially or entirely overlap) such that two or more off-board components may monitor movements of vehicle systems within the same overlapping portion of the network of route.

In one example of operation of the vehicle control systems described herein, the vehicle system may be traveling on a route 106F that extends from a first portion 200 of the route network into a different, second portion 202 of the route network. Movement of vehicle systems in the first portion of the route network may be monitored and/or controlled by a first off-board component 104A of the vehicle control system. Movement of vehicle systems in the second portion of the route network may be monitored and/or controlled by a second off-board component 104B of the vehicle control system.

The vehicle system may report locations of the vehicle system as the vehicle system moves along this route. As the vehicle system begins leaving the first portion of the route network and approaches entry into the second portion the route network, the off-board components may identify routes 106F, 106G, 106H that are in the second portion of the route network but that the vehicle system may move onto upon entry or shortly after entry into the second portion of the route network. These routes may be identified as the routes that are within a configurable threshold distance of the current route of the vehicle system upon entry into the second portion of the route network, routes that intersect the current route of the vehicle system within the threshold distance of entry into the second portion of the route network, and so on.

The onboard component may present and receive a selection of a route that is outside the first portion of the route network, but that is within the second portion of the route network. This selected route may be communicated to the first and/or second off-board component (and communicated to the second off-board component if communicated to the first off-board component). Responsive to receiving this selected route, the second off-board component may determine whether there are one or more other, alternate routes that are within a threshold distance 110 of the selected route (e.g., the route 106F). For example, the routes 106G, 106H, 106J may be within a threshold distance of the route 106F upon entry of the vehicle system into the second portion of the route network. The second off-board component may communicate these routes 106G, 106H, 106J, and/or the current route 106F of the vehicle system, to the onboard component of the vehicle system.

The onboard component of the vehicle system may present these routes to the operator for selection to determine which route the vehicle system will or may travel on in the second portion of the route network. The selection (or absence of a selection) may then be used to control or change movement of the vehicle system, as described herein. This can help ensure that passage of the vehicle system between different portions of the route network does not result in the vehicle system unknowingly entering onto a route without the off-board component being aware (and unable to track) movement of the vehicle system in the second portion of the route network.

Figure 3:
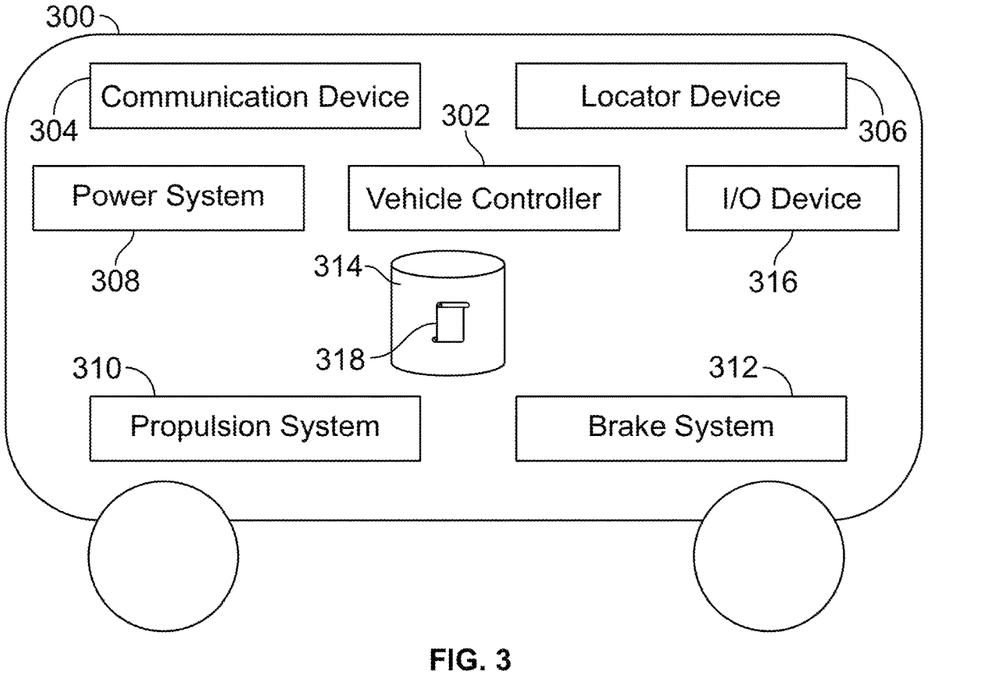
FIG. 3 schematically illustrates one example of a vehicle in the vehicle systems shown in FIGS. 1 and 2.

FIG. 3 schematically illustrates one example of a vehicle 300 in the vehicle systems 102 shown in FIGS. 1 and 2. The vehicle may represent one or more vehicle in each, or at least one, of these vehicle systems. The vehicle may include a vehicle controller 302 as an onboard component of the vehicle control system. The vehicle controller can represent hardware circuitry that includes and/or is connected with one or more processors that perform operations of the onboard component as described herein. The vehicle controller may communicate with the off-board components using a communication device 304. The communication device can represent transceiving hardware that may include one or more antennas, modems, transceivers, or the like, for communication between the vehicle systems and/or between the vehicle system and the off-board components.

A locator device 306 can represent a GNSS receiver (such as a GPS receiver), a dead reckoning system, or the like, that determines locations or positions of the vehicle (and vehicle system). As described above, locations determined by the locator device can be used to determine which routes are to be presented as potential routes for travel of the vehicle system. A power system 308 of the vehicle system may be an onboard source of energy for the vehicle system and components, such as one or more batteries, fuel cells, engines, alternators, generators, flywheels, ultracapacitors, or the like. A propulsion system 310 of the vehicle system represents one or more propulsion-generating devices, such as engines, motors, or the like, that may be partially or entirely powered by the power system. A brake system 312 of the vehicle system represents one or more brakes, such as one or more friction brakes, air brakes, dynamic brakes (which may include motor(s) of the propulsion system), etc. As described above, the vehicle controller can automatically control the propulsion system and/or brake system to change movement of the vehicle system.

A tangible and non-transitory computer-readable storage medium, or memory, 314 may store information such as locations of the vehicle system, sets of potential routes, selected ones of the potential routes, route information, movement authorities or other signals received from the off-board components indicating where, when, and/or how the vehicle system can move in the route network, etc. as data files 318. An input and/or output device 316 ("I/O Device" in FIG. 3) can present the lists or sets of potential routes and/or receive selections of routes. The I/O device can represent one or more display devices, touchscreens, keyboard, microphones, speakers, switches, levers, buttons, etc.

Figure 4:
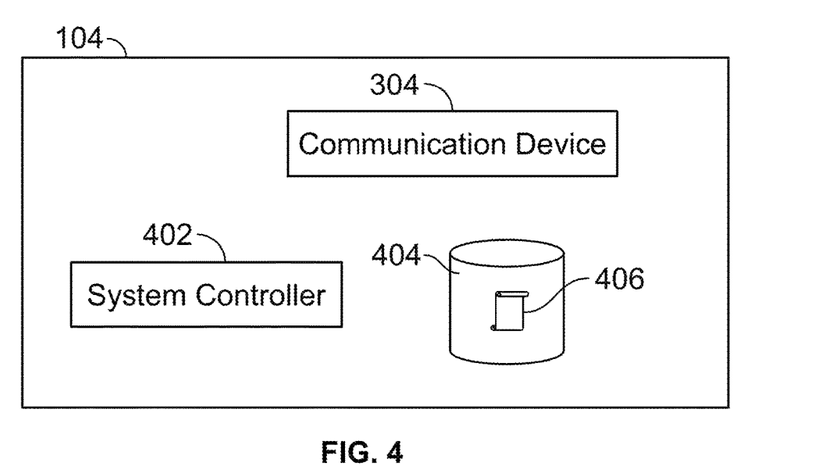
FIG. 4 schematically illustrates one example of an off-board component of the vehicle control system shown in FIGS. 1 and 2.

FIG. 4 schematically illustrates one example of the off-board component 104 of the vehicle control system shown in FIGS. 1 and 2. The off-board component may include a system controller 402 that represents hardware circuitry that includes and/or is connected with one or more processors that perform operations of the off-board component as described herein. The system controller may communicate with the onboard components and/or other off-board components using a communication device 304 that may be similar or identical to the communication device shown in FIG. 3.

A tangible and non-transitory computer-readable storage medium, or memory, 404 may store information such as locations of the vehicle system, sets of potential routes, route layouts, selected ones of the potential routes, route information, movement authorities or other signals received from the off-board components indicating where, when, and/or how the vehicle system can move in the route network, etc. as data files 406. As described above, the system controller can receive or determine locations of vehicle systems, identify potential routes for the vehicle systems based on the locations of the vehicle systems, send lists or sets of two or more routes to each of the vehicle systems based on the identifies locations, determine that a route is not selected by the onboard component(s), and then send signals to automatically stop or restrict movement, as described herein.

Figure 5:
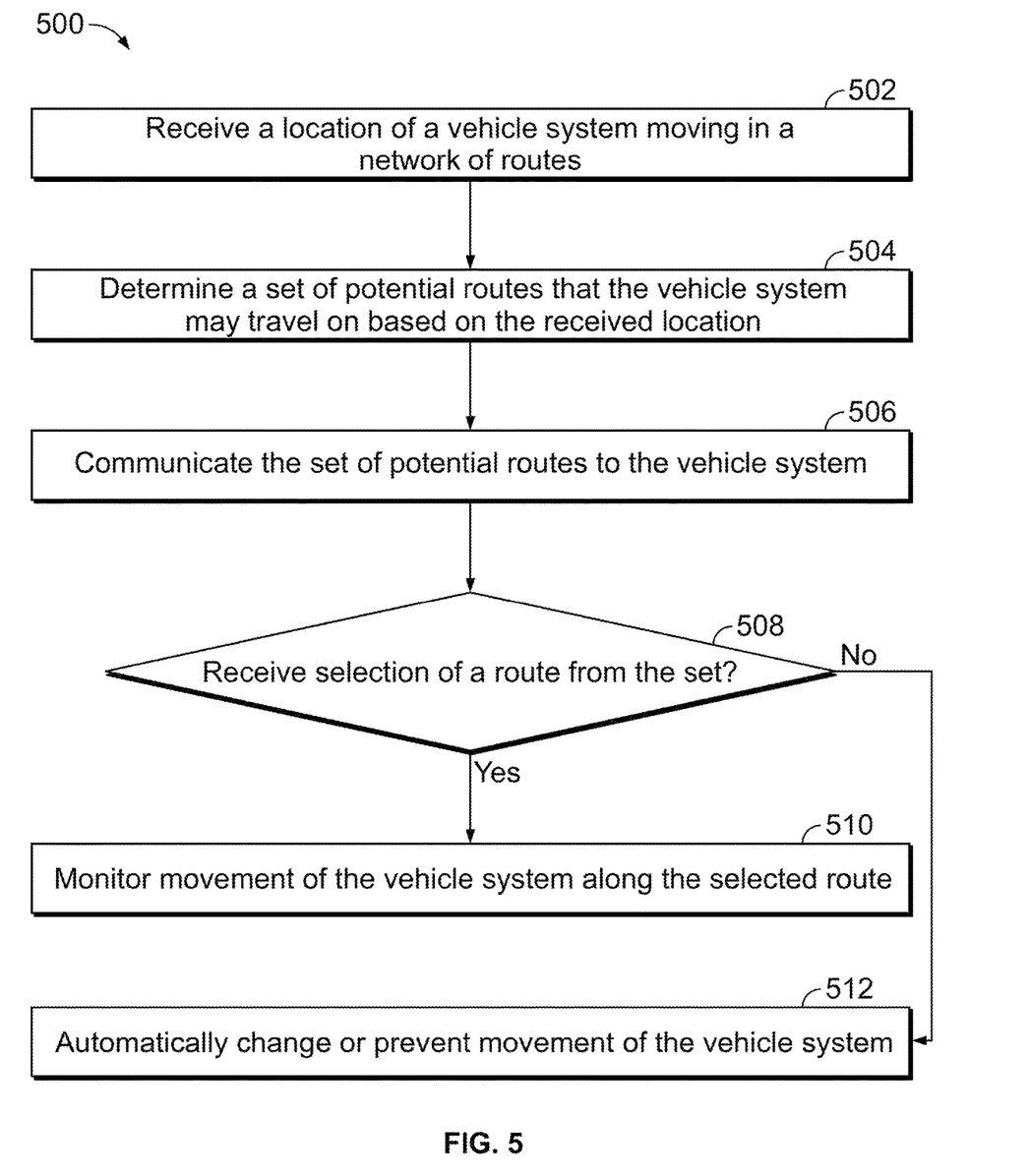
FIG. 5 illustrates a flowchart of one example of a method for monitoring and/or controlling movement of a vehicle system in a route network.

FIG. 5 illustrates a flowchart of one example of a method 500 for monitoring and/or controlling movement of a vehicle system in a route network. The method can represent operations performed by the vehicle control system described above in one example. At step 502, a location of the vehicle system is received or determined. The vehicle system may communicate the location to the off-board component monitoring at least a portion of a route network. At step 504, a set of potential routes is identified. The off-board component may determine which routes that the vehicle system may travel on based on the location that was communicated. At step 506, the set of the potential routes that is identified is communicated to the vehicle system.

At step 508, a determination is made as to whether the vehicle system communicated a selection of a route from the set that was sent to the vehicle system. If a selection was made, then the vehicle control system can continue to monitor movement of the vehicle system to ensure the vehicle system is traveling safely within the route network. As a result, flow of the method can proceed toward step 510. At step 510, movement of the vehicle system continues to be monitored to ensure that the vehicle system is safely moving within the route network.

But if a route selection is not received at step 508, then flow of the method 500 can proceed toward step 512. At step 512, movement of the vehicle system is changed, such as by stopping or slowing movement of the vehicle system, by preventing the vehicle system from starting movement, or the like. This can ensure that the vehicle system is not able to move or move far within the route network until the off-board component of the vehicle control system can determine which route the vehicle system is traveling along. Flow of the method may terminate after step 510 or step 512, or may return to one or more prior operations, such as step 502.

A method is provided that may include obtaining route information for a network of first routes that a vehicle system is headed toward from an off-board component of a vehicle control system that sends directive signals to the vehicle system to notify the vehicle system where the vehicle system can move, determining a set of potential routes from the first routes in the network using the route information, presenting the set of the potential routes to an operator of the vehicle system, determining whether a selection of a selected route of the potential routes is received from the operator, and responsive to not receiving the selection of the selected route, automatically changing movement of the vehicle system.

Automatically changing the movement of the vehicle system may include automatically engaging one or more brakes of the vehicle system, preventing further movement of the vehicle system, and/or coasting the vehicle system to a stationary position. The set of the potential routes may be determined by identifying the first routes in the network that are within a configurable threshold distance of the vehicle system. The set of the potential routes may be determined based on whether the vehicle system is entering or leaving the network of the routes.

The method optionally may include receiving the selection of an outside route that is outside of the network of the routes, determining that one or more alternate routes are within a threshold distance of the outside route that is selected, and responsive to receiving the selection of the outside route and determining that the one or more alternate routes are within the threshold distance, automatically changing movement of the vehicle system.

Automatically changing the movement of the vehicle system may begin responsive to not receiving the selection of the selected route within a designated period of time following presentation of the set of the potential routes. Presenting the set of the potential routes, determining whether the selection of the selected route is received, and automatically changing the movement of the vehicle system may occur while the first vehicle system is moving.

Presenting the set of the potential routes, determining whether the selection of the selected route is received, and automatically changing the movement of the vehicle system may occur while the vehicle system is stationary. The method may also include communicating a notification signal from the vehicle system to the vehicle control system responsive to determining that the selection of the selected route is not received.

The route data files for the network of the first routes may be obtained from the vehicle control system. The method also may include communicating one or more locations of the vehicle system to a PTC system as the vehicle control system. The set of potential routes may be determined based on the one or more locations that are communicated. The route data file may be obtained from the PTC system.

A vehicle control system is provided that may include a vehicle controller that may be onboard a vehicle system. The vehicle controller may obtain a route data file for a network of first routes that the vehicle system is headed toward from the off-board component. The vehicle controller may determine a set of potential routes from the first routes in the network using the route data file, present the set of the potential routes to an operator of the vehicle system, determine whether a selection of a selected route of the potential routes is received from the operator, and automatically change movement of the vehicle system responsive to not receiving the selection of the selected route.

The vehicle controller may automatically change the movement of the vehicle system by automatically engaging one or more brakes of the vehicle system, by preventing further movement of the vehicle system, and/or by coasting the vehicle system to a stationary position. The vehicle controller may determine the set of the potential routes by identifying the first routes in the network that are within a configurable threshold distance of the vehicle system.

A method is provided that may include determining a set of potential routes in a PTC system network of routes using a current location of a vehicle system, presenting the set of the potential routes to an operator of the vehicle system, determining whether a selection of a selected route of the potential routes is received from the operator, and responsive to not receiving the selection of the selected route, automatically slowing or stopping movement of the vehicle system.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different sets of potential routes to select a set of potential routes, and then provide an output (e.g., the set of potential routes). The controller may receive additional input of the route that is selected, such as analysis of whether a route was selected (or not), that indicates whether the machine-selected set of potential routes provided a desirable outcome or not. Based on this additional input, the controller can change the model, such as by changing which sets of potential routes is selected when a similar or identical location is received the next time or iteration. The controller can then use the changed or updated model again to select a set of potential routes, receive feedback on the selected route or absence of a selected route, change or update the model again, etc., in additional iterations to repeatedly improve or change the model using artificial intelligence or machine learning.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   obtaining route information for a network of first routes that a vehicle system is headed toward from an off-board component of a vehicle control system that sends directive signals to the vehicle system to notify the vehicle system where the vehicle system can move;
   determining a set of potential routes from the first routes in the network using the route information;
   presenting the set of the potential routes to an operator of the vehicle system;
   determining whether a selection of a selected route of the potential routes is received from the operator; and
   responsive to not receiving the selection of the selected route, automatically changing movement of the vehicle system.

2. The method of claim 1, wherein automatically changing the movement of the vehicle system includes automatically engaging one or more brakes of the vehicle system.

3. The method of claim 1, wherein automatically changing the movement of the vehicle system includes preventing further movement of the vehicle system.

4. The method of claim 1, wherein automatically changing the movement of the vehicle system includes coasting the vehicle system to a stationary position.

5. The method of claim 1, wherein the set of the potential routes are determined by identifying the first routes in the network that are within a configurable threshold distance of the vehicle system.

6. The method of claim 1, wherein the set of the potential routes are determined based on whether the vehicle system is entering or leaving the network of the routes.

7. The method of claim 1, further comprising:
   receiving the selection of an outside route that is outside of the network of the routes;
   determining that one or more alternate routes are within a threshold distance of the outside route that is selected; and
   responsive to receiving the selection of the outside route and determining that the one or more alternate routes are within the threshold distance, automatically changing movement of the vehicle system.

8. The method of claim 1, wherein automatically changing the movement of the vehicle system begins responsive to not receiving the selection of the selected route within a designated period of time following presentation of the set of the potential routes.

9. The method of claim 1, wherein presenting the set of the potential routes, determining whether the selection of the selected route is received, and automatically changing the movement of the vehicle system occurs while the first vehicle system is moving.

10. The method of claim 1, wherein presenting the set of the potential routes, determining whether the selection of the selected route is received, and automatically changing the movement of the vehicle system occurs while the vehicle system is stationary.

11. The method of claim 1, further comprising:
    communicating a notification signal from the vehicle system to the vehicle control system responsive to determining that the selection of the selected route is not received.

12. The method of claim 1, wherein the route information for the network of the first routes are obtained from the vehicle control system.

13. The method of claim 1, further comprising communicating one or more locations of the vehicle system to a positive train control (PTC) system as the vehicle control system, the set of potential routes determined based on the one or more locations that are communicated.

14. The method of claim 13, wherein the route information is obtained from the PTC system.

15. A vehicle control system comprising:
    a vehicle controller configured to be onboard a vehicle system, the vehicle controller configured to obtain a route data file for a network of first routes that the vehicle system is headed toward from an off-board component,
    the vehicle controller configured to determine a set of potential routes from the first routes in the network using the route data file, present the set of the potential routes to an operator of the vehicle system, determine whether a selection of a selected route of the potential routes is received from the operator, and automatically change movement of the vehicle system responsive to not receiving the selection of the selected route.

16. The vehicle control system of claim 15, wherein the vehicle controller is configured to automatically change the movement of the vehicle system by automatically engaging one or more brakes of the vehicle system.

17. The vehicle control system of claim 15, wherein the vehicle controller is configured to automatically change the movement of the vehicle system by preventing further movement of the vehicle system.

18. The vehicle control system of claim 15, wherein the vehicle controller is configured to automatically change the movement of the vehicle system by coasting the vehicle system to a stationary position.

19. The vehicle control system of claim 15, wherein the vehicle controller is configured to determine the set of the potential routes by identifying the first routes in the network that are within a configurable threshold distance of the vehicle system.

20. A method comprising:
    determining a set of potential routes in a positive train control (PTC) system network of routes using a current location of a vehicle system;
    presenting the set of the potential routes to an operator of the vehicle system;
    determining whether a selection of a selected route of the potential routes is received from the operator; and
    responsive to not receiving the selection of the selected route, automatically slowing or stopping movement of the vehicle system.

* * * * *